US012743366B2

(12) United States Patent
Bayer et al.

(10) Patent No.: US 12,743,366 B2
(45) Date of Patent: Sep. 22, 2026

(54) TEST SEQUENCE FOR STOP-AT-FIRST-FAIL TESTING

(71) Applicant: Robert Bosch GmbH, Stuttgart (DE)

(72) Inventors: Sebastian Bayer, Schoenaich (DE); Michel Janus, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 18/468,318

(22) Filed: Sep. 15, 2023

(65) Prior Publication Data

US 2024/0264930 A1 Aug. 8, 2024

(30) Foreign Application Priority Data

Feb. 2, 2023 (EP) .................................... 23154761

(51) Int. Cl.
*G06F 11/36* (2025.01)
*G06F 9/44* (2018.01)
*G06F 11/3668* (2025.01)

(52) U.S. Cl.
CPC ...... *G06F 11/3688* (2013.01); *G06F 11/3684* (2013.01); *G06F 11/36* (2013.01); *G06F 11/3676* (2013.01); *G06F 11/368* (2013.01); *G06F 11/3692* (2013.01)

(58) Field of Classification Search
CPC ............ G06F 11/3688; G06F 11/3684; G06F 11/3692; G06F 11/36; G06F 11/3676; G06F 11/3664; G06F 11/368
See application file for complete search history.

(56) References Cited

U.S. PATENT DOCUMENTS 11,315,053 B1 * 4/2022 Powell .................. G06Q 10/08
2002/0155628 A1 * 10/2002 Bulaga .................... H10P 74/23 257/E21.525
2009/0210830 A1 * 8/2009 Butler .............. G01R 31/31835 716/136

(Continued)

OTHER PUBLICATIONS

Tai Song et al., Pattern Reorder for Test Cost Reduction Through Improved SVMRANK Algorithm, Aug. 12, 2020, [Retrieved on 2025-06-03]. Retrieved from the internet: <URL: https://ieeexplore.ieee.org/stamp/stamp.jsp?tp=&arnumber=9165740> 8 Pages (147965-147972) (Year: 2020).*

(Continued)

*Primary Examiner* — Anibal Riveracruz
(74) *Attorney, Agent, or Firm* — Norton Rose Fulbright US LLP

(57) ABSTRACT

A computer-implemented method for determining a test sequence. The test sequence defines a sequential order of performing multiple tests on an instance of a product using stop-at-first-fail. One or more test data instances are accessed. A test data instance represents respective outcomes of the respective tests for an instance of the product. Test cost values are accessed representing costs of performing the respective tests. An optimization is performed of the sequential order. The optimization is configured to minimize an expected cost of performing the multiple tests according to the sequential order using stop-at-first-fail. The expected cost is determined from the one or more test data instances and the test cost values. Data is output representing the determined sequential order of the test sequence.

16 Claims, 3 Drawing Sheets

(56) References Cited

U.S. PATENT DOCUMENTS

| | | | | |
|---|---|---|---|---|
| 2013/0042152 | A1* | 2/2013 | Fryc | G06F 11/3696 714/38.1 |
| 2016/0321586 | A1 | 11/2016 | Herzig et al. | |
| 2017/0160730 | A1* | 6/2017 | Reddy | G05B 19/41865 |

OTHER PUBLICATIONS

Zhanglei Wang et al., Test-Quality/Cost Optimization Using Output-Deviation-Based Reordering of Test Patterns, 2008, [Retrieved on Mar. 23, 2026]. Retrieved from the internet: <URL: https://ieeexplore.ieee.org/stamp/stamp.jsp?tp=&arnumber=4359935> 14 Pages (352-365) (Year: 2008).*

Jin et al., "What Helped, and What Did Not? an Evaluation of the Strategies To Improve Continuous Integration," 2021 IEEE/Acm 43RD International Conference On Software Engineering (ICSE), 2021, pp. 213-225.

Gonzalez-Sanchez et al., "Prioritizing Tests for Software Fault Diagnosis," Software—Practice and Experience Software Practice Experience, vol. 41, 2011, pp. 1105-1129.

* cited by examiner

TEST SEQUENCE FOR STOP-AT-FIRST-FAIL TESTING

CROSS REFERENCE

The present application claims the benefit under 35 U.S.C. § 119 of European Patent Application No. EP 23 15 4761.3 filed on Feb. 2, 2023, which is expressly incorporated herein by reference in its entirety.

FIELD

The present invention relates to a computer-implemented method of determining a test sequence; to a system for determining a test sequence; and to a testing system comprising such a system. The present invention further relates to a computer-readable medium.

BACKGROUND INFORMATION

In manufacturing processes, automatic testing is typically performed to check that a product has been manufactured successfully and/or complies with quality assurance requirements: for example, that a manufactured electric circuit behaves as expected; that a manufactured physical object has dimensions complying with a specification; and so on.

In many cases, multiple tests need to be performed on an instance of a product, and the product needs to pass all of the tests. In such cases, stop-at-first-fail testing can be performed: the tests can be applied sequentially to the product, where the testing can stop as soon as one of the tests fails. This way, performing additional tests that are irrelevant for the overall outcome can be prevented. This operation mode often frees up additional testing capacity because the machines or people performing the tests can move on to the next part and do not have to tests parts that are already known to be defective.

The order in which to perform the tests of stop-at-first-fail testing, can depend on relations between the tests, e.g., one test may need to be performed after another test because it assumes for its operation that the other test has succeeded.

Generally, stop-at-first-fail testing can be applied in a wide range of applications; for example, in manufacturing, e.g., of semiconductors, of electronical devices, of mechanical parts, and the like; and in software development. Stop-at-first-fail testing can be automated, but also manual or semi-manual.

Despite the prevention of unnecessary tests in stop-at-first-fail, testing is still in many cases a costly process, where the cost can be any combination of, e.g., time, manpower, physical resources, energy, etcetera. For example, a large number of tests may need to be applied, but the individual tests themselves can be costly, too. Also during product development or ramp-up, it is particularly important to reduce the time of stop-at-first-fail testing because earlier failure means earlier feedback on what is wrong with the product or its manufacturing.

SUMMARY

It would be useful to perform stop-at-first-fail testing at a lower cost, e.g., in terms of time, manpower, physical resources, energy, or any other type of resource spent.

In accordance with a first aspect of the present invention, a computer-implemented method and a corresponding system are provided for determining a test sequence. In accordance with another aspect of the present invention, a testing system is provided that incorporates the system for determining a test sequence. In accordance with an aspect of the present invention, a computer-readable medium is provided.

Various measures of the present invention relate to determining a test sequence for stop-at-first-fail testing. Such a test sequence may define a sequential order of performing multiple tests on an instance of a product using stop-at-first-fail. For example, testing may start with the first test of the sequential order. If the test fails, the testing of the product may be considered failed. If the test succeeds, the second test of the sequential order may be performed, and so on, until finally the testing of the product succeeds if all tests pass, or fails if a test has failed.

Interestingly, the inventors realized that in stop-at-first-fail testing, the average test cost, e.g., the average test time or cost according to another metric, can be reduced by determining a suitable test sequence. For example, if a relatively cheap test can already filter out a lot of failed instances, then it can be beneficial to perform this relatively cheap test before a more expensive test that filters out fewer instances. However, as the inventors realized, determining a good test sequence is not just a matter of sorting tests by costs and failure probabilities, in particular because the failure probability of one test typically depends on which other tests have already been performed. For example, test A may in general fail in 50% of cases, but may fail in only 30% of cases for instances that have already successfully passed test B, etcetera.

According to an example embodiment of the present invention, in order to determine the test sequence, test cost values may be used. A respective test cost value may represent a cost of performing a respective test, e.g., in terms of time or another cost metric. In many cases, the test cost values are not all the same, although the provided techniques also provide useful results in practice if, as an approximation, all test cost values are set to the same value.

The inventors envisaged to use a set of one or more test data instances. A test data instance may represent respective outcomes of the respective tests for an instance of the product. The test data instances are typically not obtained by stop-at-first-fail testing (otherwise, not all relevant test results may be available). Instead, the tests may be applied to the instance, where one or more tests may be skipped because they rely on other tests having previously succeeded. In particular, all tests may have been applied to the instance.

According to an example embodiment of the present invention, using the set of test data instances, an optimization of the sequential order may be performed. In other words, an optimization may be performed which has a representation of the sequential order as variable (s). The optimization may be configured to minimize an expected cost of performing the multiple tests according to the sequential order using stop-at-first-fail. Here, the expected cost may be determined from the one or more test data instances and from the test cost values.

By minimizing the expected cost, dependencies between the tests may be taken into account. Namely, by estimating the expected cost of performing stop-and-first-fail from the one or more test data instances, instead of just looking separately at costs and failure probabilities of tests in isolation, the effect that the failure probability of a test can depend on what other tests have already been performed, is accounted for. This means that a more optimal choice for the test sequence can be made. The optimized sequential order can then be output, e.g., for use in automated or manual testing using stop-at-first-fail.

As will be understood, in general, the optimization can be heuristic and/or can arrive at a local optimum. Indeed, as the inventors realized and as also discussed in more detail elsewhere in this specification, the problem of determining an optimal order of the test sequence can in general be an NP-hard problem, such that finding the globally optimal solution is in many cases computationally infeasible. However, as described in this specification, it is still possible to determine a minimum that works well in practice by using heuristics.

According to an example embodiment of the present invention, optionally, the optimization may be configured to minimize a sum of respective costs of performing the multiple tests on respective test data instances according to the sequential order and according to the test cost values. Such a cost for a particular test data instance may be determined as a combination (e.g., sum) of costs of the tests that are performed according to stop-at-first-fail testing, e.g., zero or more succeeded tests followed by one failed test. The optimization may compute the costs for all test data instances, or may approximate the overall costs by computing the costs for a subset (e.g., a randomly selected subset) of test data instances, for example.

In general, various optimization techniques can be applied to perform the optimization of the sequential order. In some cases, it can be possible to perform a brute-force optimization, e.g., by computing the costs for a number of possible sequential orders (e.g., all possible sequential orders) and selecting the sequential order with the minimal costs. In many cases, e.g., when the number of tests is larger than 10 or larger than 15, this may not be feasible, however. In such a case, a heuristic optimization can be applied instead.

Optionally, according to an example embodiment of the present invention, the optimization may be performed by representing the test sequence by a path in a (directed or undirected) graph. The nodes of the graph may correspond to the tests to be performed. The expected cost for a test sequence may correspond to a cost function for the path. By representing the test sequence in a graph, the optimization can be performed by using a graph optimization algorithm. The graph optimization algorithm may be selected such that it accesses the cost function for the path in a black-box way, in the sense that the algorithm does not rely on the cost of the path being a sum of independent costs for respective edges. Various algorithms are available that satisfy the property.

In particular, the problem of selecting a path with a minimal cost may essentially correspond to a dynamic version of the travelling salesman problem (TSP), for which many heuristics are described in the literature. Various such heuristics access the cost function in a black-box way in the sense described above, and can thus be readily used in combination with the techniques described herein. In particular, a good choice for the graph optimization algorithm is 2-opt local search, as also discussed in more detail elsewhere in this specification.

Optionally, according to an example embodiment of the present invention, the optimization is performed using a solver that has a black-box functionality. Such a solver may treat the objective function as a black box, e.g., the solver may take the objective function as an input, and it may use the objective function only by evaluating it. For example, the solver may not derive a functional description of the objective function and use the functional description to symbolically compute a derivative, or the like. The evaluation can for example be outside of the core of the solver.

By using a solver with black-box functionality, it is possible to use an existing solver to perform the optimization, despite the optimization not being a regular instance of a common optimization problem such as a linear program or the like. The solver may be referred to as a general solver, in the sense that it can be configured with various optimization problems from a given class, and various cost functions in particular. In addition to receiving the objective function, the solver may receive additional inputs, e.g., inputs representing the set of tests and their associated costs, etc.

Various solvers can be used in this way to perform the optimization problem of optimizing the sequential order as described herein, and to determine a (typically heuristic) solution to that optimization problem. For example, the solver may be a constraint programming solver. Such a constraint programming solver may take a representation of the optimization as a constraint optimization problem as input, and may for example use local search, large neighbourhood search, a genetic algorithm, or greedy search to solve the problem.

One advantage of using a solver with black-box functionality is that various solvers, such as CPLEX, in particular the CPLEX CP module; or LocalSolver, are readily available in the market today, allowing such a solution to be deployed with relative ease.

Another advantage of using a solver is that it combines particularly well with having one or more constraints on the set of possible test sequences. Using a solver, it is possible to efficiently encode various such constraints and then perform the optimization subject to these constraints. For example, a constraint may enforce that a test occurs at a given position in the test sequence, in particular at the first or last position; and/or that a first test occurs before a second test in the test sequence. In practice it is often beneficial to be able to use constraints, because this can lead to more desirable test sequences, or because without such constraints a test sequence may not be performable, e.g., one test may rely on the output of another test.

Although constraints work well with a solver with black-box functionality, constraints can also be used with other techniques; for example, constraints also work with brute force search, and certain constraints can be represented by a graph to which a graph optimization algorithm is applied; e.g., a test can be constrained to be the first test by it having only outgoing edges in the graph, and so on.

According to an example embodiment of the present invention, optionally, having determined the test sequence, the multiple tests may be performed on one or more instances of the product, using stop-at-first-fail according to the determined test sequence. The tests are in many cases performed in an automated way, e.g., fully controlled by a computer, but it is also possible to perform manual testing or semi-manual testing based on the determined test sequence. In particular, one or more batches of the product may be tested by applying the test sequence to all instances of the batch.

According to an example embodiment of the present invention, optionally, the one or more test data instances may be collected by testing instances of the product without stop-at-first-fail. For example, stop-at-first-fail may be temporarily disabled. For example, each of the multiple tests may be performed on the product instances. As also discussed elsewhere, it is also possible in this case that one or more tests are skipped, not because of stop-at-first-fail, but because these tests depend on the successful execution of a previous test that has failed. Stopping because of stop-atfirst fail may be problematic because it results in incomplete data for the optimization of the sequential order. Interestingly, however, stopping because of dependencies between tests does not have this problem. In a valid test sequence for which an expected cost is computed, these tests may also be skipped due to the dependency. Having determined an improved test sequence, the used test sequence may be updated accordingly, and stop-at-first-fail may be re-enabled.

According to an example embodiment of the present invention, optionally, the process of temporarily disabling stop-at-first-fail; collecting test data instances; performing an optimization of the test sequence; and re-enabling stop-at-first-fail using the updated test sequence, may be repeated. For example, this can be periodic and/or triggered, e.g., by introduction of a new test.

According to an example embodiment of the present invention, optionally, a new testing sequence may be determined upon detecting a drift in a failure rate of a test of the test sequence. For example, if it is detected that a measured failure probability has changed with respect to previous measurements, or with respect to the expected failure probability according to the data based on which the test sequence was determined, this may indicate that the test sequence is no longer optimal, and accordingly that it is beneficial to determine an updated test sequence.

The provided techniques can be applied in a wide range of settings, for example in the area of manufacturing or software development. In an embodiment, the product being tested is an electrical component. In an embodiment, the product being tested is a software product. Depending on the setting, also a wide range of tests is possible, e.g., physical tests such as an electrical functionality test, an optical inspection or the like; or digital tests such as a software unit test.

Depending on the setting, various types of costs may be defined. For example, a test cost can be indicative of an execution time of performing the test, but also of an amount of manpower, physical resources and/or energy being used by the test.

According to an example embodiment of the present invention, optionally, the product being tested may be a semiconductor device or a part of a semiconductor chip. For such products, testing contributes significantly to the overall manufacturing costs. Moreover, failure rates are relatively high, making it especially beneficial to apply the techniques described herein. The testing can be at the wafer level or at the final stage of testing, for example. For instance, the set of tests may comprise an electrical functionality test.

According to an example embodiment of the present invention, optionally, the product being tested may be a software artifact. Automated testing is an important part of developing and deploying software. For example, the software may be tested periodically, e.g., when making a daily nightly build or the like, or triggered by a change, e.g., using continuous integration. With software, it is particularly important to have a test sequence that fails as quickly as possible, since feedback of the failed test can be used to correct problems in the software or the way it is deployed.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
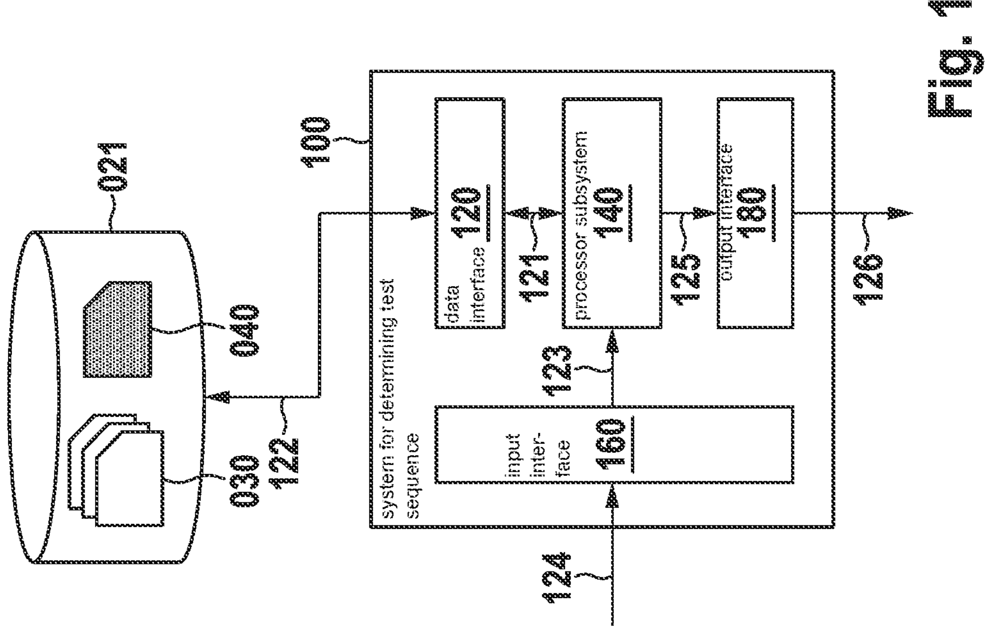
FIG. 1 shows a system for determining a test sequence, according to an example embodiment of the present invention.

FIG. 1 shows a system 100 for determining a test sequence. The test sequence may define a sequential order of performing multiple tests on an instance of a product using stop-at-first-fail. For example, the number of tests may be at least 20, at least 50, or at least 200.

The system 100 may comprise a data interface 120. Data interface 120 may be for accessing access test cost values 030 representing costs of performing the respective tests. The test cost can in general differ per test, but it is also possible to set the test cost values all to the same value as a simplification. Data interface 120 may also be for accessing the test sequence 040 that the system is configured to determine.

For example, as also illustrated in FIG. 1, the data interface 120 may be constituted by a data storage interface which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 021 may be an internal data storage of the system 100, such as a hard drive or SSD, but also an external data storage, e.g., a network-accessible data storage. In some embodiments, respective data may each be accessed from a different data storage, e.g., via a different subsystem of the data storage interface 120. Each subsystem may be of a type as is described above for data storage interface 120.

System 100 may further comprise an input interface 160 for accessing one or more test data instances 124. A test data instance may represent respective outcomes of the respective tests for an instance of the product. For example, the number of collected test data instances may be at least 10, at least 1000, at least 10000, or at least 50000. The input interface 160 may take on various forms.

In an embodiment, the input interface 160 may comprise a communication interface 160 configured for communication with one or more other systems that provide the test data instances 124. Communication interface 160 may internally communicate with processor subsystem 140 via data communication 123. Communication interface 160 may be arranged for direct communication with the other system (s), e.g., using USB, IEEE 1394, or similar interfaces. Communication interface 160 may also communicate over a computer network, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4 G antenna, a ZigBee chip, etc., as appropriate for the computer network. Communication interface 160 may also be an internal communication interface, e.g., a bus, an API, a storage interface, etc.

In an embodiment (not shown), the input interface 160 comprises a data interface, e.g., the data interface may be as described for data interface 120 or may be implemented by that data interface.

In an embodiment (not shown), the input interface 160 comprises a sensor interface for obtaining sensor data acquired by one or more sensors measuring sensor data indicative of a test outcome. The sensor (s) can but do not need to be part of the system 100. The sensor (s) may have any suitable form, such as an image sensor, a lidar sensor, a radar sensor, a pressure sensor, a temperature sensor, etc. In some embodiments, the sensor data may comprise sensor measurements of different physical quantities in that it may be obtained from two or more different sensors sensing different physical quantities. The sensor data interface may have any suitable form corresponding in type to the type of sensor, including but not limited to a low-level communication interface, e.g., based on I2C or SPI data communication.

The system 100 may further comprise a processor subsystem 140 which may be configured to, during operation of the system 100, perform an optimization of the sequential order 040 of the multiple tests. The optimization may be configured to minimize an expected cost of performing the multiple tests according to the sequential order 040 using stop-at-first-fail. Processor subsystem 140 may be configured to determine the expected cost from the one or more test data instances 124 and the test cost values 030.

The system 100 may further comprise an output interface 180 for outputting data 126 representing the determined sequential order 040 of the test sequence. The output interface 180 may comprise data interface and/or a communication interface as described for the input interface 160. As shown in the figure, in an embodiment, the output interface 180 may comprises an actuator interface for providing control data 126 to an actuator (not shown). Such control data 126 may be generated by the processor subsystem 140 to control one or more test unit to perform testing of a product instance according to stop-at-first-fail, e.g., based on the processor subsystem obtaining the results of previous tests on the product instance via input interface 160. The actuator may be part of system 100. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc.

Figure 2:
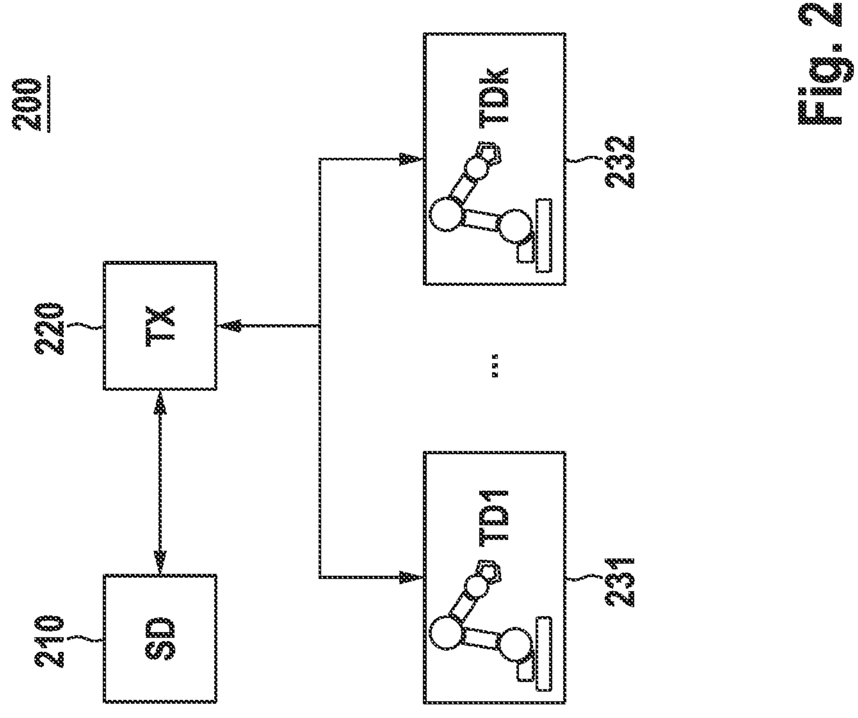
FIG. 2 shows a testing system, according to an example embodiment of the present invention.

In general, each system described in this specification, including but not limited to the system 100 of FIG. 1 and the systems shown in FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash.

Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 100 may be part of vehicle, robot or similar physical entity, and/or may be represent a control system configured to control the physical entity.

FIG. 2 shows a testing system 200 for automated stop-at-first-fail-testing of instances of a product. This system may be used to test a semiconductor device or a part of a semiconductor chip, for example.

The system 200 may comprise one or more test units TDi to perform the tests. As an illustrative example, the figure shows two test units TD1, 231; TDk, 232. A test unit may be configured to perform one or more tests. The set of tests that a unit TDi can perform may be overlapping, e.g., multiple identical units may be available that can perform the same set of tests. For example, a test unit can comprise one or more actuators, e.g., a robot arm, to physically act on the product instance, and/or one or more sensors, e.g., a camera, to collect data from the product instance, as also described with respect to FIG. 1.

For example, one of the test units TDi may be configured to perform a contact test on one or more electrical connections of an electronic circuit. Such tests are common when producing electronics. The same or another test unit TDj may be configured to perform a further test that relies on the presence of the electrical connections. For example, the further test may program a desired output voltage, and check that the correct output voltage is provided. Such a further test may need that the electrical connection is correct otherwise it may risk damaging the product or testing equipment. In such a case, the further test may be constrained to be performed after the contact test using the techniques described herein.

The test units may be separate devices. Although this figure illustrates physical testing, the described techniques also apply to digital testing, where a test unit can for example be a cloud instance, a virtual machine, etc.

The system may further comprise a test execution unit TX, 220, configured to control the test units TDi to perform the tests. For example, the test execution unit may be configured with a test sequence and may control the test units TDi to perform the tests using stop-at-first-fail according to the test sequence. The test execution unit TX may be implemented using the components as described for system 100 of FIG. 1.

Further, the system may comprise a sequence determining unit SD, 210. The sequencing determining unit may be implemented by system 100 of FIG. 1 and may optionally be combined with the test execution unit TX and one, more, or all of the test units TDi into a single device. Due to the optimized sequential order determined by sequencing determining unit SD, the system 200 may be enabled to perform stop-at-first-fail testing with lower test costs.

System 200 may itself be part of a manufacturing system, for example for the manufacturing of a semiconductor device or a semiconductor chip. For example, the manufacturing system may comprise a subsystem for producing instances of a product, and may comprise the testing system 200 for testing the produced instances. The production and testing can be fully automated, for example.

Some detailed examples are now given of the expected costs associated with performing multiple tests according to stop-at-first-fail, and how these expected costs relate to the test sequence that is used for the testing.

Example 1

In this example, n product instances, e.g., parts, are tested with two tests, $t_1$ and $t_2$. The costs of the two tests are $c_1=10$ and $c_2=1$, respectively. The rate of defective parts in the two tests are $p_1=0.01$ and $p_2=0.05$. In this example, the failure rates are independent of each other. With stop-at-first fail, the testing of a part can stop once a failure is detected. In this example, the expected cost per part, depending on the sequence, is:

$$E[t_1 \to t_2] = c_1 + (1 - p_1) \cdot c_2 = 10.99$$

$$E[t_2 \to t_1] = c_2 + (1 - p_2) \cdot c_1 = 10.5$$

Therefore, performing test 2 first, i.e. using test sequence $t_2 \to t_1$, is beneficial in this scenario.

Example 2

In this example, three test data instances are used that represent outcomes of performing five tests on instances of a product. In this example, it is not assumed that failure rates are independent of each other.

Test data instances may be represented as a matrix D with binary entries of test outcomes, e.g.:

$$D = \begin{bmatrix} 1 & 1 & 1 & 1 & 1 \\ 1 & 1 & 1 & 0 & 0 \\ 1 & 0 & 1 & 1 & 0 \end{bmatrix} \begin{matrix} \text{Part 1} \\ \text{Part 2} \\ \text{Part 3} \end{matrix}$$

where, in this example, the respective columns represent the five respective tests, and "1" denotes a successful test and "0" denotes a failed test.

Performing the tests on these parts using stop-at-first-fail may result in observing only part of this matrix, e.g., with test sequence 1→2→3→4→5, the observed test outcomes may be:

$$\tilde{D} = \begin{bmatrix} 1 & 1 & 1 & 1 & 1 \\ 1 & 1 & 1 & 0 & - \\ 1 & 0 & - & - & - \end{bmatrix} \begin{matrix} \text{Part 1} \\ \text{Part 2} \\ \text{Part 3} \end{matrix}$$

where "1" means the test was successful, "0" means the test failed and "-" means the test was skipped. (Although not shown in this example, tests may be skipped also when not using stop-at-first fail, in particular because they may rely on the outcome of other failed tests.)

In this example, if stop-at-first-fail is used, the test cost is decreased compared to performing all tests, because parts 2 and 3 do not have to be fully tested. For example, the time needed for the tests may decrease because a machine and/or person running the test could continue with the next part earlier.

It can be noted from this example that the costs savings of stop-at-first-fail can strongly depend on the actual sequential order in which the tests are performed. For instance, the total cost of the sequence 1→2→3→4→5 for the above parts is:

$$3 \cdot c_1 + 3 \cdot c_2 + 2 \cdot c_3 + 2 \cdot c_4 + 1 \cdot c_5,$$

where $c_i$ is the cost of test i=1, . . . , 5. The factors for the respective costs, e.g., $2 \cdot c_3$, can be explained by the fact that, at this point, only two parts survived due to stop-at-first-fail and test 3 has to be performed two times.

As an example, when using the reversed testing sequence, 5→4→3→2→1, the costs for the above three parts are:

$$3 \cdot c_5 + 1 \cdot c_4 + 1 \cdot c_3 + 1 \cdot c_2 + 1 \cdot \text{c\_1},$$

which shows that the total costs depend on the ordering of the tests and on the value of the $c_i$. Interestingly, it can be noted that the above formula, which represents a sum of the costs of performing the multiple tests on the respective test data instances according to a given sequential order and according to the test cost values $c_i$, does not explicitly use the failure probabilities of the respective tests and in particular does not explicitly quantify the dependence of these failure probabilities on previously performed test. Instead, due to determining the sum of costs for test data instances for which test outcomes are available, such dependencies between failure probabilities are implicitly taken into account.

Figure 3:
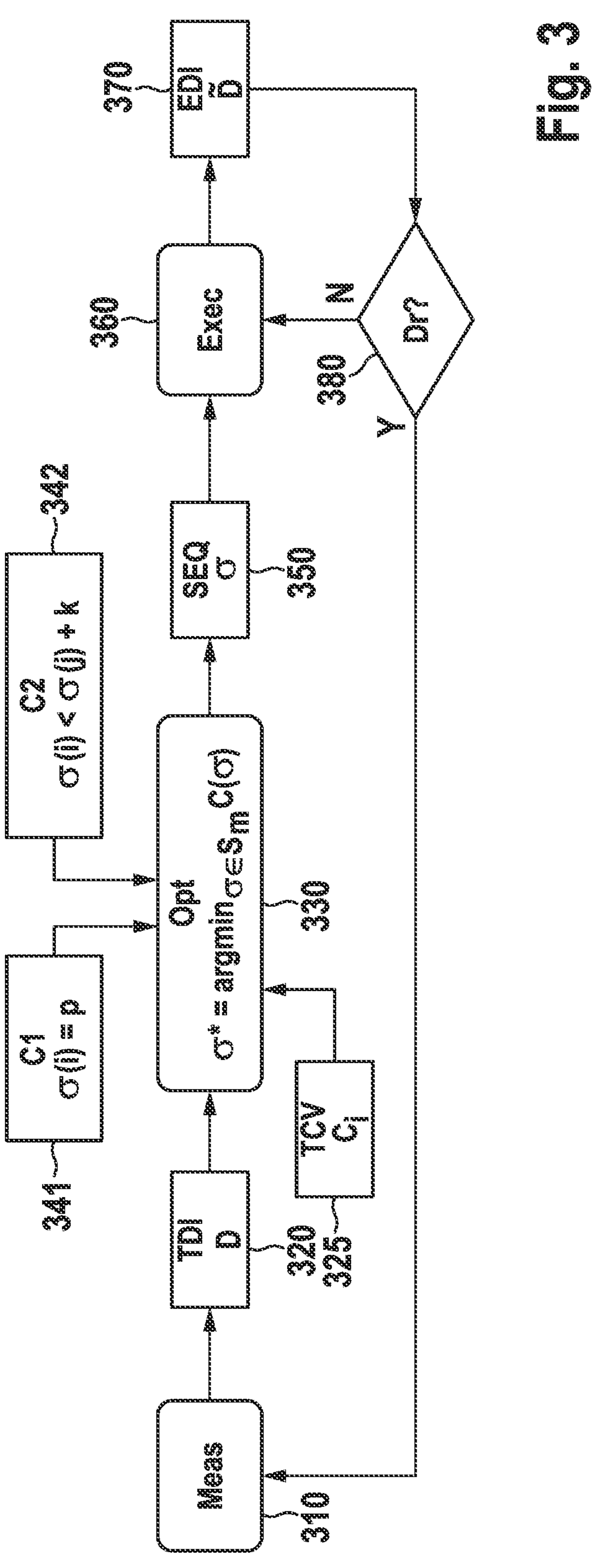
FIG. 3 shows a detailed example of how to determine a test sequence, according to an example embodiment of the present invention.

FIG. 3 shows a detailed, yet non-limiting, example of how to determine a test sequence SEQ, 350.

Generally, a test sequence SEQ may define a sequential order of performing multiple tests on an instance of a product using stop-at-first-fail testing. Such a test sequence can for example be denoted as a permutation σ=(σ(1), . . . , σ(m)) of the first m natural numbers 1, . . . , m, where m is the number of tests. This permutation may denote that the test with index σ(1) is performed first; if it succeeds; the test with index σ(2) is carried out next; and so on, until a first test has failed or until all tests have succeeded.

The figure shows a measurement operation Meas, 310. The measurement operation may be used to determine a set of one or more test data instances TDI, 320. Such a test data instance may represent respective outcomes of the respective tests for an instance of the product. Here, the tests may be performed on the product instance without stop-at-firstfail, e.g., stop-at-first-fail may be temporarily disabled to run the entire test sequence for the respective instances. In particular, all tests may be performed on the instances, or at least all tests that are possible in view of their dependencies, e.g., a test may be skipped if it depends on another test that has failed. The test data instances TDI may be represented by a matrix D of test decisions, e.g., $$D \in \mathbb{Z}_2^{n \times m}$$

or $D \in \{0,1,-\}^{n \times m}$, where n is the number of test instances, e.g., the number of tested parts.

The figure further shows test cost values TCV, 325. Respective test cost values $c_i$ may represent costs of performing respective tests i, e.g., in terms of time, energy, or another cost metric. These costs may be assumed, for the purposes of applying the present techniques, to be independent from the particular instance being tested. Costs TCV can be represented as real or natural numbers, for example. It is also possible to assume that test costs $c_i$ are all equal, e.g., all equal to one, which still in many cases gives a reasonable result. Test cost values TCV are typically manually entered but can also be measured automatically, e.g., as part of measurement operation Meas.

The figure further shows an optimization operation Opt, 330. This operation may be configured to perform an optimization of the sequential order SEQ. In particular, the optimization may be configured to minimize an expected cost of performing the multiple tests 1, . . . , m according to the sequential order SEQ using stop-at-first-fail. As illustrated in the figure, the expected cost may be determined from the one or more test data instances TDI and the test cost values TCV.

In particular, the cost per instance for performing all tests without stop-at-first-fail may be computed as:

$$\sum_{i=1}^{m} c_i,$$

where $c_i$ is the cost of test i=1, . . . , m. In this example of not using stop-at-first-fail, the expected cost is independent of the ordering of tests SEQ and of the test results TDI.

When using stop-at-first-fail according to the test sequence SEQ, testing may stop after the first observation of a failure. In a matrix representation D of test data instances TDI, this first observation of a failure may correspond to the first occurrence of a 0 in the row of D for a specific product instance. In terms of this matrix representation, the expected cost of performing the multiple tests according to sequence σ, SEQ, may accordingly be represented as:

$$C(\sigma) = n^{-1} \sum_{j=1}^{n} \sum_{i=1}^{m} \left( \prod_{k=1}^{i-1} d_{j,\sigma(k)} \right) \cdot c_{\sigma(i)},$$

where $d_{j,i}$ is the decision of test i=1, . . . , m for test data instance j=1, . . . , n. In terms of this representation, the optimization of the sequential order may be represented as the optimization problem to find a test ordering $\sigma^* \in S_m$, where $S_m$ is the set of permutations of the numbers 1, . . . , m, that minimizes the expected cost, e.g., $$\sigma^* = \operatorname{argmin}_{\sigma \in S_m} C(\sigma),$$

e.g., testing sequence σ* may minimize the average test cost (or equivalently, the total test cost).

In the above example, the optimization minimizes a sum of respective costs of performing the multiple tests on respective test data instances TDI according to the sequential order SEQ and according to the test cost values TCV. The sum can be the sum of costs for all test data instances, but it is also possible to, at least during the optimization, approximate this sum by computing it for a subset of test data instances, or to otherwise approximate the above formula in order to, at least approximately, minimize the expected cost.

In general, the above optimization problem can be interpreted as a dynamic version of the Traveling Salesperson Problem (TSP), with nodes corresponding to tests and paths corresponding to test sequences. The TSP version is dynamic in the sense that the costs of moving from one node to the next are not known upfront, but can depend on the sequence taken so far. In particular, the above optimization problem is NP-hard, since the original TSP, which is already NP-hard, can be reduced to the above optimization problem.

Various approaches are possible to solve the above optimization problem, or variants thereof. In some cases, e.g., if the number of tests is smaller than 10 or at least smaller than 12 or 15, the sequential order may be determined by an exhaustive search, e.g., by enumerating the total test times (e.g., based on all test data instances, or approximated from a subset of them) of respective permutations (e.g., all of them, or a random selection), and selecting a permutation based on this (e.g., selecting the permutation with the minimal total test time).

In many cases, in particular when an exhaustive search is too computationally expensive, the optimization may be performed heuristically. In particular, the optimization may not reach the absolute minimum but may find a, still useful, approximation of it. In general, such a minimization can use a variety of approaches, e.g. Greedy Search, Genetic Algorithms, Local Search, and/or another suitable meta-heuristic. In particular, the problem may be solved by using a solver that is designed for a broader class of optimization problems in terms of which the present optimization can be phrased, and that accesses the objective function in a black-box way. For example, the solver can be a constraint programming solver or a local search solver. In particular, the solver can be CPLEX (e.g., version 20.1.0) or LocalSolver (e.g., version 11.5). It is also possible to use a graph optimization algorithm, as discussed in more detail with respect to FIG. 4.

In practice, in many cases, there can be technical requirements on the tests that are performed, that make certain test sequences undesirable or even impossible. For example, a second test may rely on the outcome of a first test. For example, the second test may use an output of the first test as an input, e.g., the first test may run a software artifact and the second test may check its output. Or, the second test may only work if the first test has been completed successfully, e.g., the first test can be a contact test on one or more electrical connections of an electronic circuit, and the second test can be a test that relies on the presence of the electrical connections and that may otherwise e.g. possibly result in damage to testing equipment, or in any case no test data may be available without electrical connection. As another example, because of technical requirements there may need to be a certain minimum amount of time between two tests.

As shown in the figure, to take such technical requirements into account, a number of constraints Ci can optionally be imposed on the sequential order of the test. The optimization Opt may be configured to perform the optimization subject to these constraints Ci. This way, compliance the technically determined position requirements may be ensured.

For example, a first constraint C1, 341 may enforce that a particular test occurs at a given position in the test sequence SEQ, for example, at the first position, at the last position, or at any other position. Such an absolute position of a test item in the testing sequence SEQ may for example be enforced by adding constraint C1: $\sigma(i)=p$ to the optimization problem, where $i\in\{1, \ldots, m\}$ and $p\in\{1, \ldots, m\}$.

Instead or in addition, a second constraint C2, 342, may enforce that a first test occurs before a second test in the test sequence; in particular, that there is a given exact or minimal difference between the tests. Such an exact or relative distance between two test items may for example be ensured via one or more of the following constraints C2, 342:

$$\sigma(i)=\sigma(j)+k,\ k\in\mathbb{N}_{\neq 0}$$

$$\sigma(i)\leq\sigma(j)+k,\ k\in\mathbb{N}$$

$$\sigma(i)<\sigma(j)+k,\ k\in\mathbb{N}$$

where $i\in\{1, \ldots, m\}$ and $j\in\{1, \ldots, m\}$, with $i\neq j$.

Constraints may also represent the possibility to parallelize a number of tests. For example, it may be possible to perform a set of tests in parallel, and constraints may be used to enforce that this set of tests are adjacent in the test sequence. Having obtained the optimized testing sequence SEQ such that these tests are adjacent in the sequence, these tests may then be performed in parallel.

Optimization Opt may be configured to take the constraints Ci into account in various ways, depending on the type of optimization used. Exhaustive search can filter out test sequences not complying with the constraints. Also graph optimization algorithms cay take constraints into account e.g. by adapting the graph to be optimized, as also discussed with respect to FIG. 4. Using a solver is especially convenient in combination with constraints because the optimization problem that is input to the solver, can be adapted to incorporate the constraints. Especially when using general solver such as CPLEX or LocalSolver, it is possible in this way to support a wide range of constraints and a large degree of customization of these constraints by the user.

The figure further shows an execution operation Exec in which the optimized sequence SEQ is used to perform the multiple tests on one or more product instances using stop-at-first-fail. In particular, having determined the optimized sequence SEQ, stop-at-first-fail can be re-enabled if it was temporarily disabled to collect the measurement data TDI. This way, execution Exec can be performed at a lower cost. Performing the tests may result in execution data instances EDI representing the outcomes of the tests that have been performed. Compared to the test data instances TDI, the execution data instances EDI typically have fewer test results because more tests have been skipped. In particular, EDI may indicate that all tests have passed or that a particular first test has failed. It is also possible for execution operation Exec to output only whether or not all tests have passed for a given instance, for example.

As illustrated in the figure, based on the execution data instances EDI, a drift detection Dr?, 380, may be performed. The drift detection may detect a drift in a failure rate of the overall test sequence or of one or more particular tests of the test sequence. Such a drift can occur for example because of aging of the machines of a manufacturing process. For example, the proportion of times the ith test has failed for a number of recent test instances may be measured and may be compared to earlier measured proportions or an expected proportion derived from the test data instances TDI. If a drift is detected, e.g., a failure rate has changed by a certain absolute or relative threshold, this may be indicative that the data TDI that sequence SEQ was based on, is no longer valid. Accordingly, the measurement Meas and optimization Opt may be repeated to determine an updated sequence SEQ that can be used in later testing executions Exec.

Apart from drift detection, there are also other reasons why the measurement Meas and optimization Opt can be manually or automatically repeated. For example, this can be done periodically and/or in response to a structural changes such as the introduction of a new test item.

Figure 4:
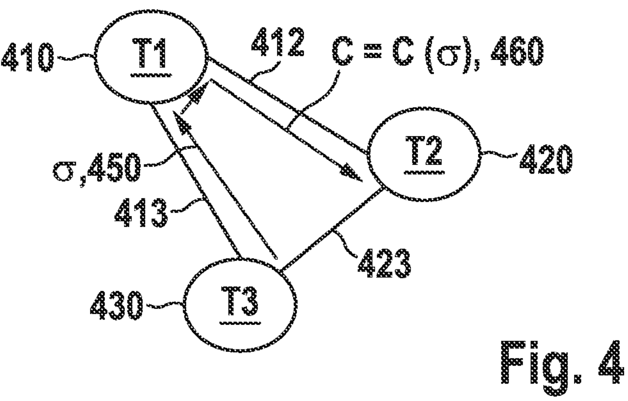
FIG. 4 shows a test sequence represented as a path in a graph, according to an example embodiment of the present invention.

FIG. 4 shows detailed, yet non-limiting, example of a test sequence represented as a path in a graph.

Interestingly, the inventors noted a correspondence between, on the one hand, the problem of minimizing an expected cost of performing multiple tests according to a sequential order using stop-at-first-fail, and on the other hand, the travelling salesman problem as is described in the optimization literature. Namely, the problem can be interpreted as a dynamic version of the Traveling Salesperson Problem, where the cost of moving from one node to the next is not known upfront, but depends on the sequence taken so far.

In particular, as shown in the figure, the different tests to be performed may be represented as nodes of a graph. By way of illustration, the figure shows three nodes T1, 410; T2, 420; and T3, 430; corresponding to three tests to be performed on instances of a product. An edge between two tests may correspond to the possibility of performing one test directly after the other in the test sequence. For example, if all tests can be performed independently from each other, the graph can be a fully connected, undirected graph. By using a graph that is not fully connected and/or that is directed, it is possible to represent the constraint that one test can or cannot be performed directly before another test. For simplicity, the figure shows a fully connected, undirected graph with edge 412 between nodes T1 and T2; edge 413 between nodes T1 and T3; and edge 423 between nodes T2 and T3.

A test sequence may be represented by a path in the graph. For example, the figure shows a path 450 that starts at node T3, visits node T1, and then visits node T2, and that may accordingly correspond to test sequence $\sigma$: 3→1→2. For consistency with some graph optimization algorithms, e.g., TSP solvers, the path can end at the first node, e.g., the path representing $\sigma$: 3→1→2 can additionally traverse the edge from T2 to T3.

The expected cost $C(\sigma)$, 460 for such a test sequence $\sigma$ may be used as a cost function for the path. The test sequence may be determined by performing a graph optimization algorithm that finds a route in the graph that visits all nodes exactly once (and optionally, returns to the initial node) and has the lowest value for the cost function. By constraining the route to start or end at a certain node, or to visit a certain node at a certain position in the path, it is possible to implement constraints concerning the position of tests in a test sequence, for example.

It is noted that the cost of a path in the present optimization problem is in general not equal to the sum of costs of respective edges, because the failure probability of a test is affected by which tests have been performed before. In particular, a change in the candidate solution may result in a re-evaluation of the cost function, e.g., re-revaluation of respective costs of performing tests on test data instances according to the test sequence represented by the candidate solution. Various graph optimization algorithms, e.g., travelling salesman solvers, that do not make this assumption but that e.g., evaluate the cost function for full paths in a black-box way, can be readily applied in the present situation.

A particular example of a graph optimization algorithm that can be used, is 2-opt local search, also known as 2-opt swap. This is an example of a graph optimization problem that iteratively determines candidate improvements for a current path, and replaces the current path by a candidate if it has lower cost. By evaluating the cost for the candidate as the expected cost of performing tests according to stop-at-first-fail, this expected cost can be minimized, at least heuristically. For example, the following algorithm provides a pseudocode implementation of 2-opt local search that can be used.

Algorithm. Minimize expected cost of tests according to stop-at-first-fail

```
Input.  Graph representing tests to be applied;
existing_route: path representing test sequence (e.g., as
currently applied)
repeat until no improvement is made {
   best_distance = calculateTotalDistance(existing_route)
   start_again:
   for (i = 0; i <= number of nodes eligible to be swapped - 1;
i++) {
      for (j = i + 1; j <= number of nodes eligible to be
swapped; j++) {
         new_route = 2optSwap(existing_route, i, j)
         new_distance = calculateTotalDistance(new_route)
         if (new_distance < best_distance) {
            existing_route = new_route
            best_distance = new_distance
            goto start_again
         }
      }
   }
}
def 2optSwap(route, v1, v2) {
   take route[0] to route[v1] and add them in order to new_route
   take route[v1+1] to route[v2] and add them in reverse order
to new_route
   take route[v2+1] to route[start] and add them in order to
new_route
   return new_route;
}
```

Here, calculateTotalDistance (new_route) may be calculated as the expected cost of performing the test according to the test sequence represented by the path new_route.

Figure 5:
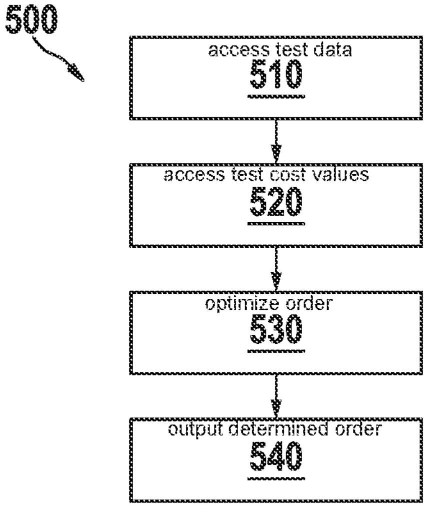
FIG. 5 shows a computer-implemented method of determining a test sequence, according to an example embodiment of the present invention.

FIG. 5 shows a block-diagram of computer-implemented method 500 of determining a test sequence. The test sequence may define a sequential order of performing multiple tests on an instance of a product using stop-at-first-fail. The method 500 may correspond to an operation of the system 100 of FIG. 1. However, this is not a limitation, in that the method 500 may also be performed using another system, apparatus or device.

The method 500 may comprise, in an operation titled "ACCESS TEST DATA", accessing 510 one or more test data instances. A test data instance may represent respective outcomes of the respective tests for an instance of the product.

The method 500 may comprise, in an operation titled "ACCESS TEST COSTS", accessing 520 test cost values representing costs of performing the respective tests.

The method 500 may comprise, in an operation titled "OPTIMIZE ORDER", performing 530 an optimization of the sequential order. The optimization may be configured to minimize an expected cost of performing the multiple tests according to the sequential order using stop-at-first-fail. The expected cost may be determined from the one or more test data instances and the test cost values.

The method 500 may comprise, in an operation titled "OUTPUT DETERMINED ORDER", outputting 540 data representing the determined sequential order of the test sequence.

It will be appreciated that, in general, the operations of method 500 of FIG. 5 may be performed in any suitable order, e.g., consecutively, simultaneously, or a combination thereof, subject to, where applicable, a particular order being necessitated, e.g., by input/output relations.

Figure 6:
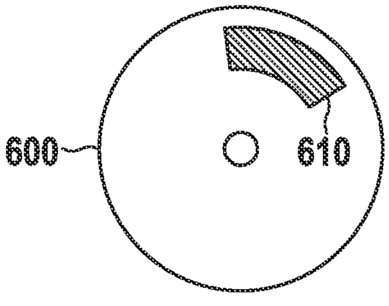
FIG. 6 shows a computer-readable medium comprising data, according to an example embodiment of the present invention.

The method (s) may be implemented on a computer as a computer implemented method, as dedicated hardware, or as a combination of both. As also illustrated in FIG. 6, instructions for the computer, e.g., executable code, may be stored on a computer readable medium 600, e.g., in the form of a series 610 of machine-readable physical marks and/or as a series of elements having different electrical, e.g., magnetic, or optical properties or values. The medium 600 may be transitory or non-transitory. Examples of computer readable mediums include memory devices, optical storage devices, integrated circuits, servers, online software, etc. FIG. 6 shows an optical disc 600. Alternatively, the computer readable medium 600 may comprise data 610 representing a sequential order of a test sequence determined as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described in connection with mutually different embodiments does not indicate that a combination of these measures cannot be used to advantage.

What is claimed is:

1. A computer-implemented method for determining an optimized test sequence, wherein the optimized test sequence defines an optimized sequential order of performing multiple tests on an instance of a product using stop-at-first-fail testing, the method comprising the following steps:

accessing one or more historical test data instances, wherein each test data instance represents respective outcomes of respective tests previously performed for an instance of the product;

accessing test cost values representing respective costs of performing the respective tests;

performing an optimization of the sequential order based on the historical test data instances and the respective test cost values, wherein:

the optimization computes, for respective sequential orders of a plurality of candidate test sequences, a respective expected overall test cost as a respective sum of the respective test cost values for those of the multiple tests expected to be performed under a stop-at-first-fail constraint within the respective candidate test sequence;

the computation includes, for each of the plurality of candidate test sequences, determining from the one or more historical test data instances and for each test in the respective sequential order of the respective candidate test sequence, a sequence-specific probability that the respective test will not be reached for execution due to failure of one or more tests preceding the test in the respective candidate test sequence, the expected overall test cost for the respective candidate test sequence being determined by weighting the test cost value of each test by a probability that the test will be reached for execution in the respective candidate test sequence; and the optimization includes selecting, as the optimized test sequence, one of the plurality of candidate test sequences having a lowest expected overall test cost among the computed expected overall test costs; and outputting the selected optimized test sequence.

2. The computer-implemented method of claim 1, wherein the test sequences are represented by respective paths in a graph, wherein the respective expected overall cost for a respective one of the test sequences corresponds to a cost function for the respective path of the respective test sequence, and wherein the optimization is performed by a graph optimization algorithm.

3. The computer-implemented method of claim 2, wherein the graph optimization algorithm is a 2-opt local search.

4. The computer-implemented method of claim 1, wherein the optimization is performed using a solver with a black-box functionality.

5. The computer-implemented method of claim 1, further comprising:

obtaining data representing one or more constraints on which of the tests are able to be performed prior to which other ones of the tests, wherein in the performing of the optimization, the optimization is subject to the one or more constraints.

6. The computer-implemented method of claim 5, wherein the constraints enforce that:

a test occurs at a given position in the test sequence; and/or a first test occurs before a second test in the test sequence.

7. The computer-implemented method of claim 1, further comprising:

performing the multiple tests on one or more instances of the product using the stop-at-first-fail testing according to the optimized sequential order of the test sequence.

8. The computer-implemented method of claim 7, further comprising:

detecting a drift in a failure rate of a test of the test sequence; and repeating the optimization to obtain an updated sequential order of the test sequence.

9. The computer-implemented method of claim 1, wherein the product is a semiconductor device or a part of a semiconductor chip.

10. The computer-implemented method of claim 1, wherein the product is a software artifact.

11. The computer-implemented method of claim 1, wherein the respective costs include respective resource costs of conducting respective ones of the tests.

12. The computer-implemented method of claim 1, wherein the respective costs include respective time costs of conducting the respective ones of the tests.

13. The computer-implemented method of claim 1, wherein the optimization is further based on determined sequence-dependent failure probabilities of the respective tests, which are determined from the one or more historical test data instances and which, for the respective one of the tests, account for different failure probabilities depending on in which of the plurality of sequences the respective test is conducted, such that, for the respective one of the tests, different sequence-dependent failure probabilities of the respective test are determined for different ones of the sequences.

14. A system for determining an optimized test sequence, wherein the optimized test sequence defines an optimized sequential order of performing multiple tests on an instance of a product using stop-at-first-fail testing, the system comprising:

an input interface for accessing one or more historical test data instances, wherein each test data instance represents respective outcomes of respective tests previously performed for an instance of the product;

a processor subsystem configured to:

access test cost values representing respective costs of performing the respective tests; and perform an optimization of the sequential order based on the historical test data instances and the respective test cost values, wherein:

the optimization computes, for respective sequential orders of a plurality of candidate test sequences, a respective expected overall test cost as a respective sum of the respective test cost values for those of the multiple tests expected to be performed under a stop-at-first-fail constraint within the respective candidate test sequence;

the computation includes, for each of the plurality of candidate test sequences, determining from the one or more historical test data instances and for each test in the respective sequential order of the respective candidate test sequence, a sequence-specific probability that the respective test will not be reached for execution due to failure of one or more tests preceding the test in the respective candidate test sequence, the expected overall test cost for the respective candidate test sequence being determined by weighting the test cost value of each test by a probability that the test will be reached for execution in the respective candidate test sequence; and the optimization includes selecting, as the optimized test sequence, one of the plurality of candidate test sequences having a lowest expected overall test cost among the computed expected overall test costs; and an output interface for outputting the selected optimized test sequence.

15. A testing system, comprising:

a system for determining an optimized test sequence, wherein the optimized test sequence defines an optimized sequential order of performing multiple tests on an instance of a product using stop-at-first-fail testing, the system for determining the test sequence including:

an input interface for accessing one or more historical test data instances, wherein each test data instance represents respective outcomes of respective tests previously performed for an instance of the product;

a processor subsystem configured to:

access test cost values representing respective costs of performing the respective tests; and perform an optimization of the sequential order based on the historical test data instances and the respective test cost values, wherein;

the optimization computes, for respective sequential orders of a plurality of candidate test sequences, a respective expected overall test cost as a respective sum of the respective test cost values for those of the multiple tests expected to be performed under a stop-at-first-fail constraint within the respective candidate test sequence;

the computation includes, for each of the plurality of candidate test sequences, determining from the one or more historical test data instances and for each test in the respective sequential order of the respective candidate test sequence, a sequence-specific probability that the respective test will not be reached for execution due to failure of one or more tests preceding the test in the respective candidate test sequence, the expected overall test cost for the respective candidate test sequence being determined by weighting the test cost value of each test by a probability that the test will be reached for execution in the respective candidate test sequence; and the optimization includes selecting, as the optimized test sequence, one of the plurality of candidate test sequences having a lowest expected overall test cost among the computed expected overall test costs; and an output interface for outputting the selected optimized test sequence; and one or more test units configured to carry out the multiple tests of the selected optimized test sequence.

16. A non-transitory computer-readable medium on which are stored data representing instructions that are executable by a processor system for determining a test sequence, wherein the optimized test sequence defines an optimized sequential order of performing multiple tests on an instance of a product using stop-at-first-fail testing, the instructions, when executed by the processor system, causing the processor system to perform the following steps:

accessing one or more historical test data instances, wherein each test data instance represents respective outcomes of respective tests previously performed for an instance of the product;

performing an optimization of the sequential order based on the historical test data instances and the respective test cost values, wherein;

the optimization computes, for respective sequential orders of a plurality of candidate test sequences, a respective expected overall test cost as a respective sum of the respective test cost values for those of the multiple tests expected to be performed under a stop-at-first-fail constraint within the respective candidate test sequence;

the computation includes, for each of the plurality of candidate test sequences, determining from the one or more historical test data instances and for each test in the respective sequential order of the respective candidate test sequence, a sequence-specific probability that the respective test will not be reached for execution due to failure of one or more tests preceding the test in the respective candidate test sequence, the expected overall test cost for the respective candidate test sequence being determined by weighting the test cost value of each test by a probability that the test will be reached for execution in the respective candidate test sequence; and the optimization includes selecting, as the optimized test sequence, one of the plurality of candidate test sequences having a lowest expected overall test cost among the computed expected overall test costs; and outputting the selected optimized test sequence.

* * * * *